May 24, 1966 D. C. BAILEY 3,252,427
HOLDER FOR OVERHEAD MEAT HOOKS
Filed July 20, 1964
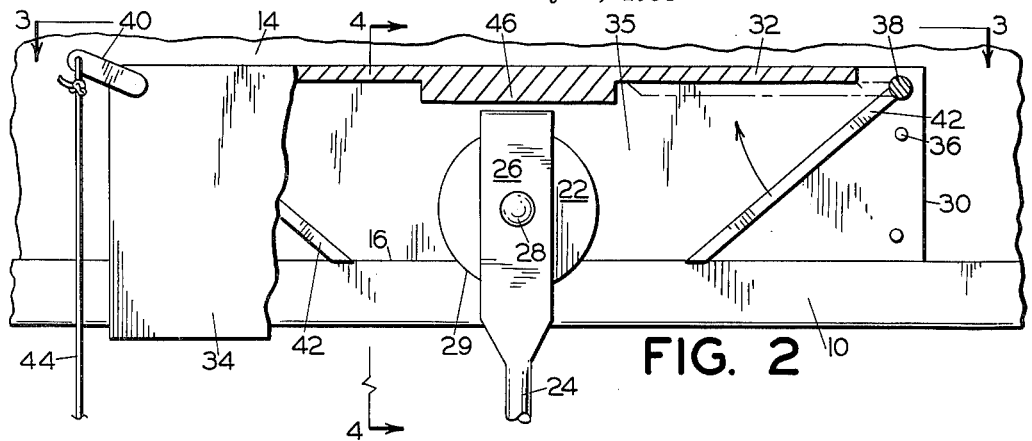
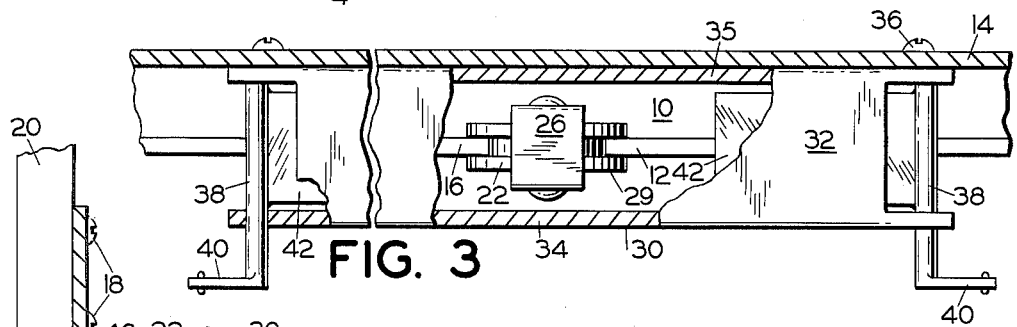
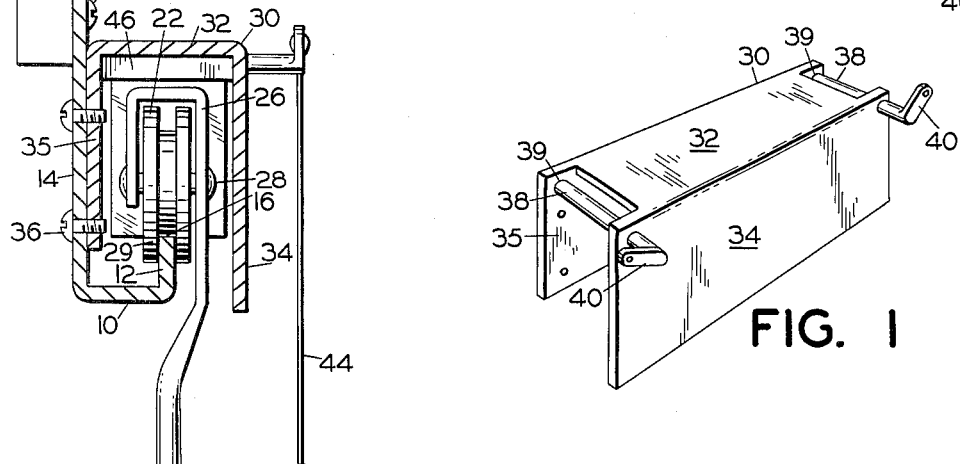
INVENTOR.
DONALD C. BAILEY
BY Eugene N. Eckelman
ATTORNEY

# United States Patent Office 3,252,427
Patented May 24, 1966

3,252,427
HOLDER FOR OVERHEAD MEAT HOOKS
Donald C. Bailey, 128 NE. Marine Drive,
Portland, Oreg.
Filed July 20, 1964, Ser. No. 383,715
3 Claims. (Cl. 104—89)

This invention relates to a holding assembly for meat hook mechanisms of the type adapted to move large pieces of meat from one station to another.

The primary objective of the present invention is to provide new and useful improvements in holders of the type described, and more particularly to provide a holder which automatically receives meat hook roller means and holds the latter in a substantially stationary position longitudinally and vertically of track means to prevent accidental displacement of the roller means from said track means while meat is being loaded on or unloaded from the hook.

A further object of the invention is to provide a holder of the type described having novel confining means in the form of pivotal flaps which automatically admit roller means of a hook and which automatically lock the roller means in the holder; and furthermore to provide release means associated with the flaps to conveniently move the roller means out of locking position.

Still another object of the invention is to provide a holder of the type described which is extremely simplified in construction, inexpensive to manufacture, and of a construction adapted for ready attachment to existing overhead meat hook track means.

Additional objects will become apparent from the following specification and claims, considered together with the accompanying drawings, wherein the numerals of reference indicate like parts.

In the drawings:

FIGURE 1 is a perspective view of a holder for overhead meat hooks embodying principles of the instant invention;

FIGURE 2 is an enlarged, front elevational view of the holder with a front wall portion thereof broken away to show internal structure;

FIGURE 3 is an enlarged top plan sectional view of the holder on line 3—3 of FIG. 2, with parts also being broken away; and FIGURE 4 is a vertical cross sectional view taken on the line 4—4 of FIGURE 2.

Conveyor means are conventionally utilized to transport large pieces of meat from one station to another. Referring first to FIGURES 2 and 4, such conveyor means comprises a track member 10 which is channel-shaped in cross section, having a forward, upturned leg portion 12 and a rear leg portion 14. The forward leg portion 12 of the track member extends the full longitudinal length of the latter and the upper edge 16 thereof forms a track surface. The rear leg portion 14 of the track member is vertically elongated and is secured, as by screws 18, to overhead support brackets 20.

One or more hook support means are operative on the track 10 and each comprises a roller 22 from which a hook 24 is suspended, the hook having an upper, inverted, channel-shaped extension 26 attached to a shaft 28 of the roller. Roller 28 has edge flanges 29 to hold it on the track.

The present invention comprises a housing or support member 30 assuming an inverted U-shaped and having a top wall 32, a front wall 34, and a rear wall 35, the ends of the holder being open.

This holder is adapted for mounting on the track member 10 at desired locations and more specifically at stations where meat is loaded onto or unloaded from the hooks 24. Securement of the holder to the track member is best illustrated in FIGURE 4 wherein screws 36 connect the rear wall 35 of the holder to the rear wall 14 of the track member.

Pivotally mounted in the walls 34 and 35 of the holder adjacent opposite ends of the latter and at the upper end thereof are shafts 38. Suitable aligned apertures 39 are provided in the walls 34 and 35 to rotatably receive said shafts. Each of the shafts projects beyond the front wall 34 of the holder and has a crank lever 40 inclined upwardly and outwardly with relation to the end edges of the holder. Integrated with the shafts 38 are flaps or baffles 42, best seen in FIGURE 2, which in a locking position thereof are angled downwardly and inwardly of the holder with the lower end resting on the track 16. In a preferred arrangement, the shafts 38 have free pivotal movement whereby the flaps 42 will rotate downwardly by gravity and normally be positioned in such locking position.

Pull strings 44, FIGURES 2 and 4, are attached to the outer ends of cranks 40, and for the purpose of lifting the flaps 42 to an upper out-of-the-way position, a downward pull is merely exerted on the strings 44. FIGURE 2 illustrates in phantom lines the upper out-of-the-way position of the right hand flap, and in such a position of the flaps the roller 22 and its support means is adapted to be freely moved along the track out of the holder. Since the flaps 42 are freely rotatable and are angled inwardly as described, it is apparent that the roller assembly of the hook 24 is freely movable into the holder, but as soon as it moves inwardly past one of the flaps, said flap will drop and confine the roller assembly interiorly of the holder. Such roller assembly therefore cannot be disengaged from the holder until one of the flaps 42 is raised.

The clearance between the bottom surface of the top wall 32 and the upper end of the hook roller assembly is less than the radial dimension of the roller flanges so that the roller cannot be disengaged from the track 10 while it is in the holder. Furthermore, to hold the roller assembly substantially stationary in a vertical direction, the upper wall 32 of the holder has a downwardly extending projection 46 the bottom surface of which is in close proximity to the upper surface of the roller assembly. Thus, there will only be a minute amount of vertical play in the hook assembly and this rigidity assists in the removal of meat from the hook.

Thus, in the use of the present holder, the hook assembly is rolled along the track and freely passes into one end of the holder by rolling under one of the flaps 42. When the hook assembly is substantially in the center of the holder, the meat is easily taken off the hook since the latter is anchored vertically and furthermore has only a minimum amount of longitudinal movement. To move the hook assembly from the holder, the desired flap 42 is raised by pulling down on the respective pull string 44, whereupon the hook assembly is free to roll along the track away from the holder.

It is to be understood that the form of my invention herein shown and described is to be taken as a preferred example of the same and that various changes in the shape, size and arrangement of parts may be resorted to without departing from the spirit of my invention or the scope of the subjoined claims.

Having thus described my invention, I claim:

1. A holder for overhead meat hooks of the type having a track and a hook assembly arranged for rolling engagement on the track, comprising a housing arranged for mounting adjacent the track, a flap pivotally mounted on said housing adjacent one end thereof, said flap projecting angularly with relation to the track and having one end thereof disposed in close association with the track to prevent movement of the hook assembly out the said one end of the housing, and means for pivoting the flap to move the one end thereof away from the track to permit movement of the hook assembly out the one end of the housing, said housing having a top wall the lower surface of which is closely adjacent the upper end of the hook assembly to limit upward movement of the latter to prevent displacement thereof from the track.

2. A holder for overhead meat hooks of the type having a track and a hook assembly arranged for rolling engagement on the track, comprising a housing arranged for mounting adjacent the track, a flap pivotally mounted on said housing adjacent one end thereof, said flap projecting angularly with relation to the track and having one end thereof disposed in close association with the track to prevent movement of the hook assembly out the said one end of the housing, means for pivoting the flap to move the one end thereof away from the track to permit movement of the hook assembly out the one end of the housing, said housing having a top wall, and a projection on said top wall extending downwardly into said housing, the lower surface of said projection being disposed closely adjacent the upper end of the hook assembly to limit upward movement of the latter to prevent displacement thereof from the track.

3. A holder for overhead meat hooks of the type having a track and a hook assembly arranged for rolling engagement on the track, comprising a support member arranged for mounting adjacent the track, a flap pivotally mounted on said support member, said flap being pivotal adjacent the track to a position in the path of the hook assembly to prevent movement of the latter in one direction, and means for pivoting the flap to move it out of the path of the hook assembly to permit movement of the hook assembly thereby, said support member having a wall portion the lower surface of which is closely adjacent the upper end of the hook assembly to limit upward movement of the latter to prevent displacement thereof from the track.

References Cited by the Examiner

UNITED STATES PATENTS

| | | | |
|---|---|---|---|
| 1,553,439 | 9/1925 | Goldberg | 104—98 |
| 1,927,678 | 9/1933 | Bennington. | |
| 2,818,031 | 12/1957 | Peele et al. | 104—93 |
| 3,088,418 | 5/1963 | Armitage et al. | 104—250 X |

ARTHUR L. LA PLANT, *Primary Examiner.*

F. W. MONAGHAN, *Assistant Examiner.*